United States Patent
Zhang et al.

(10) Patent No.: US 10,545,990 B2
(45) Date of Patent: Jan. 28, 2020

(54) REPLICATION BETWEEN HETEROGENEOUS STORAGE SYSTEMS

(71) Applicant: Veritas Technologies LLC, Mountain View, CA (US)

(72) Inventors: Xianbo Zhang, Plymouth, MN (US); Weibao Wu, Vadnais Heights, MN (US); Timothy Stevens, Andover, MN (US); Shuangmin Zhang, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 296 days.

(21) Appl. No.: 15/086,361

(22) Filed: Mar. 31, 2016

(65) Prior Publication Data

US 2017/0286512 A1    Oct. 5, 2017

(51) Int. Cl.
*G06F 16/27* (2019.01)
*G06F 11/14* (2006.01)
*G06F 3/06* (2006.01)
*G06F 11/20* (2006.01)
*H04L 29/08* (2006.01)

(52) U.S. Cl.
CPC .......... *G06F 16/27* (2019.01); *G06F 11/1464* (2013.01); *H04L 67/1095* (2013.01); *G06F 2201/84* (2013.01)

(58) Field of Classification Search
CPC ......... G06F 17/30286; G06F 17/30067; G06F 3/067; G06F 17/30575; G06F 16/27; G06F 11/2058; G06F 11/1464; G06F 3/0623; G06F 3/065; G06F 2201/84; G06Q 10/10; H04L 67/1095
USPC ................................................. 707/609, 620
See application file for complete search history.

(56) References Cited

U.S. PATENT DOCUMENTS

| | | | |
|---|---|---|---|
| 6,889,228 B1 | 5/2005 | Federwisch | |
| 7,647,449 B1 * | 1/2010 | Roy | G06F 11/2064 711/112 |
| 2009/0307286 A1 * | 12/2009 | Laffin | G06F 11/1451 |
| 2016/0210200 A1 * | 7/2016 | Kumarasamy | G06F 11/1464 |
| 2017/0083563 A1 * | 3/2017 | Vijayan | G06F 16/27 |

FOREIGN PATENT DOCUMENTS

EP    2078254 A2    7/2009

OTHER PUBLICATIONS www.slideshare.net, "Symantec Backup Exec Blueprints". Published Oct. 2, 2014. "https://www.slideshare.net/symantec/technical-white-papersymantec-backup-exec-2014-blueprints-ost-powered-appliances". Accessed Sep. 26, 2018. pp. 1-35. (Year: 2014).*
Symantec: "Symantec—NetBackup 7.1 Feature Briefing", http://vox.veritas.com/legacyfs/online/veritasdata/93479857-Feature-Briefing-NetBackup-7-1-Auto-Image-Replication.pdf, Dec. 31, 2011, pp. 1-3.

* cited by examiner

*Primary Examiner* — Michael Pham
(74) *Attorney, Agent, or Firm* — Campbell Stephenson LLP

(57) ABSTRACT

Disclosed herein are systems, methods, and processes to perform replication between heterogeneous storage systems. Information associated with a backup stream is recorded during a backup operation by a source server and includes instructions. The instructions include an include instruction to include existing data and a write instruction to write new data during a replication operation. A request to perform the replication operation is received. In response to the request, the information is sent to a target server as part of performing the replication operation.

13 Claims, 13 Drawing Sheets

US 10,545,990 B2

REPLICATION BETWEEN HETEROGENEOUS STORAGE SYSTEMS

FIELD OF THE DISCLOSURE

The present disclosure relates to data replication and, more particularly, to data replication between heterogeneous storage systems.

DESCRIPTION OF THE RELATED ART

In recent years, "intelligent" storage products targeted at data backup and recovery have been introduced to the storage industry market. Storage vendors provision various such storage products to perform tasks such as data deduplication and data replication (e.g., creating a copy, writing directly to tape, and the like). To take advantage of these "intelligent" storage products, activities such as the foregoing data storage-related operations have to be coordinated with a backup and recovery software application.

For example, protocol independent application Programming Interfaces (APIs) can be provided to facilitate communication between the backup and recovery software application and multiple such storage products (e.g., to perform a backup image duplication operation). Such protocol independent APIs permit different storage vendors to utilize multiple different protocols that are suitable for and/or compatible with their storage devices (e.g., communication protocols like Fibre Channel, TCP/IP, SCSI, and the like). In addition, by separating data backup business logic from storage device implementation, such protocol independent APIs support multiple types of connectivity and file system formats.

Unfortunately, because different storage vendors provision storage products (e.g., storage devices, storage servers, storage systems, and the like) that are heterogeneous (e.g., not of the same type) performing tasks such as backup image duplication/replication, among others, is, in part, Input/Output (I/O), network traffic, and backend storage intensive.

SUMMARY OF THE DISCLOSURE

Disclosed herein are methods, systems, and processes to perform duplication between heterogeneous storage systems. One such method involves recording information associated with a backup stream during a backup operation. In this example, the information is recorded by a source server and includes instructions. The instructions include an include instruction to include existing data and a write instruction to write new data during a replication operation.

In one or more embodiments, the method receives a request to perform the replication operation. In response to the request, the method sends the information to a target server as part of performing the replication operation. The existing data is included in a replicated backup image, and the replicated backup image is stored by the target server. The new data and the information are included in a source backup image, and the source backup image is stored by the source server as part of the backup operation.

In some embodiments, upon receiving the request to perform the replication operation, the method accesses the replicated backup image, compares the replicated backup image and the information, generates a replication stream that includes the new data, and sends the replication stream to the target server.

In other embodiments, the source server implements a source storage device, the source storage device stores the backup stream and the information, the target server implements a target storage device, the target storage device stores the replicated backup image. In this example, the source storage device and the target storage device are heterogeneous.

In certain embodiments, the information includes a first offset range associated with the existing data to be included from the replicated backup image, and a second offset range associated with the new data to be written to the replicated backup image from the source backup image. In this example, the replication stream and the backup stream share a common format that is facilitated by a plug-in implementing an Open Storage Technology (OST) Application Programming Interface (API). In an alternate example, the method updates the information during performance of one or more subsequent backup operations.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects and features made apparent to those skilled in the art, by referencing the accompanying drawings.

Figure 1:
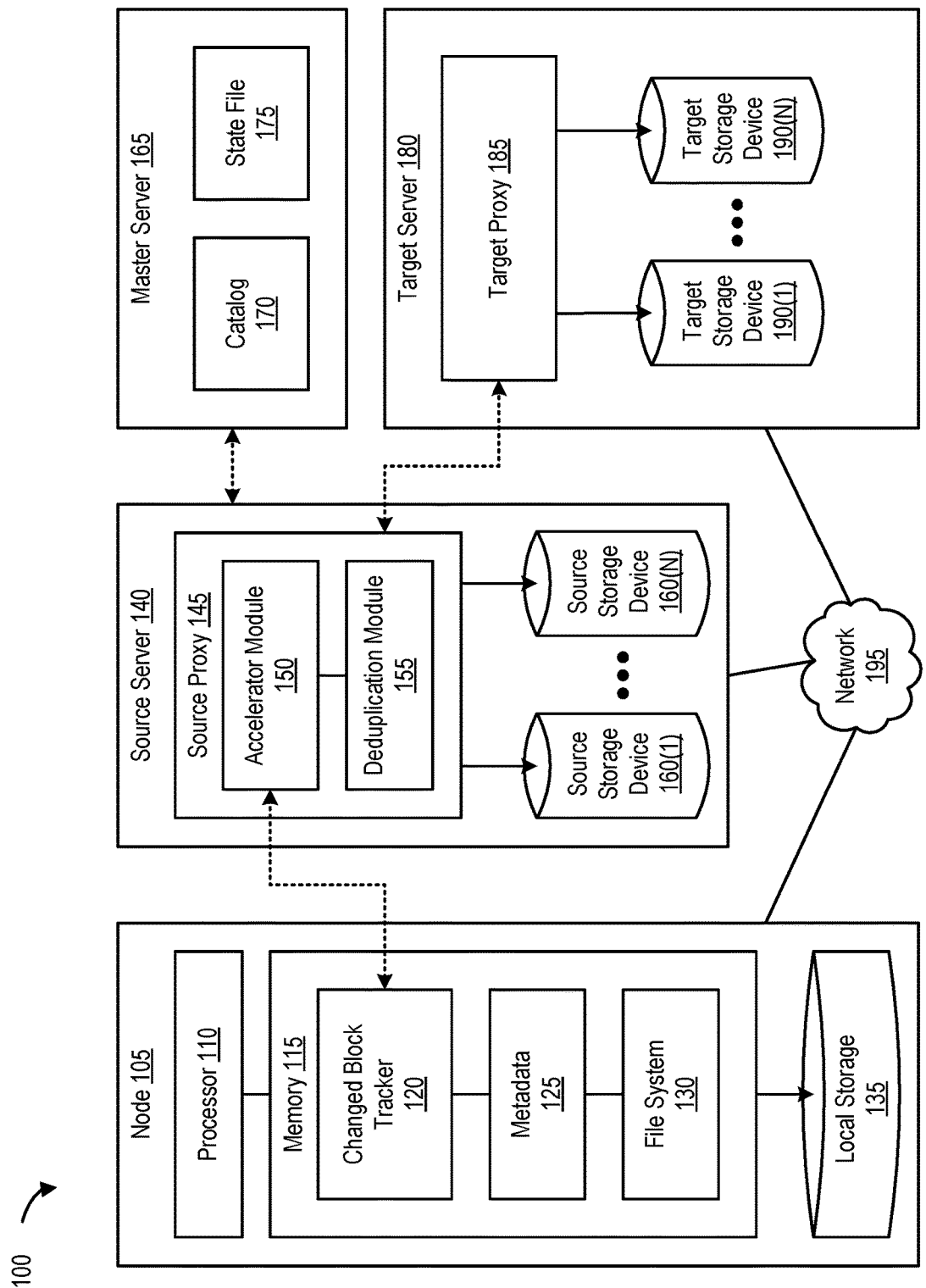
FIG. 1 is a block diagram of a computing system 100 that performs client-side deduplication, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Disclosed herein are methods, systems, and processes to perform data duplication/replication between heterogeneous storage systems, storage devices, storage servers, and/or storage products in open storage environments. NetBackup Accelerator, provided by Veritas Technologies, LLC of Mountain View, Calif., can provide full backups for the cost of an incremental backup, and can also create a synthetic full backup in approximately the same time it takes to run an incremental backup operation.

For example, NetBackup Accelerator can improve the speed of a synthetic full backup operation by combining changed data with a list of data that has already been backed up during a previous full or incremental backup operation, and deduplicating this combination of data—without reading backup images and/or creating a new backup image. Therefore, by independently tracking and deduplicating data that has already been backed up, NetBackup Accelerator only requires changed data to create a synthetic full backup set in roughly the same time it takes to run an incremental backup operation.

NetBackup Accelerator implements a platform and file system independent track log to detected changed data and sends the changed (or modified) data (segments) to a media server. NetBackup Accelerator can also deduplicate data and send unique data (e.g., changed and/or modified data segments) directly to a storage server. NetBackup Accelerator can be used to perform backup and recovery in open storage environments.

Open storage environments permit independent APIs to be provisioned to facilitate communication and manage backup and recovery operations between NetBackup Accelerator and multiple "intelligent" storage products. As previously noted, such protocol independent APIs permit different storage vendors to utilize multiple different protocols that are suitable for and/or compatible with their storage devices (e.g., communication protocols like Fibre Channel, TCP/IP, SCSI, and the like).

One consequence of providing this protocol-based interoperability between disparate storage systems and Net-Backup Accelerator is the use of heterogeneous storage devices and/or storage servers in such disparate storage systems (e.g., by different storage vendors). Because the storage devices and/or storage servers are not of the same type (e.g., in terms of operating systems, or in the use of storage and/or communication protocols, and the like), performing data storage-related tasks (and operations) such as data duplication, data deduplication, data replication, data recovery, and the like, is, in part, and among other shortcomings, I/O, network traffic, and backend storage intensive.

Example Computing Systems for Accelerating Backup Operations

FIG. 1 is a block diagram of computing system 100 that creates synthetic full backups and performs client-side deduplication, according to one embodiment. Computing system 100 includes a node 105, a source server 140, a master server 165, and a target server 180. Node 105, source server 140, master server 165, and target server 180 are communicatively coupled to each other via a network 195. Any type of network and/or interconnection other than network 195 (e.g., the Internet) can be used to facilitate communication between node 105, source server 140, master server 165, and target server 180.

Node 105 can be any of a variety of different types of computing devices, including a server, personal computing device, laptop computer, cellular phone, or the like. Node 105 includes a processor 110 and a memory 115. Memory 115 implements a changed block tracker 120, stores metadata 125, and implements a file system 130. Node 105 also includes a local storage 135 (e.g., to store data generated by an application executing on node 105).

Source server 140 includes a source proxy 145. Source proxy 145 implements an accelerator module 150 and a deduplication module 155. Source server 140 also includes source storage devices 160(1)-(N). Target server 180 includes a target proxy 185 and target storage devices 190(1)-(N). In some embodiments, source proxy 145 and target proxy 185 can be virtual machine proxy hosts and/or backup hosts. In addition, local storage 135, source storage devices 160(1)-(N), and/or target storage devices 190(1)-(N) can include one or more of a variety of different storage devices, including hard disks, compact discs, digital versatile discs, one or more solid state drives (SSDs) memory such as Flash memory, and the like, or one or more logical storage devices such as volumes implemented on one or more such physical storage devices.

Master server 165 includes a catalog 170 and a state file 175. State file 175 stores information about each unit of data (e.g., about each extent of data on a virtual disk, and the like). State file 175 can be maintained on master server 165 or at any location in the computing systems of FIGS. 1, 2, 3A, and/or 4A. Catalog 170 identifies the contents of each backup on source server 140 and/or target server 180 (e.g., the contents of a backup image stored on target storage device 190(1)).

Accelerator module 150 implemented in source server 140 can be used to accelerate backup operations. For example, accelerator module 150 can create a consolidated full backup by requesting and obtaining units of changed data (e.g., for a virtual disk and/or a physical disk of local storage 135 included in a backup operation, and the like) from node 105. Node 105 tracks units of changed data (e.g., disk sectors) using changed block tracker 120. Once identified, the units of changed data are sent from node 105 to source proxy 145.

Next, state file 175, which stores information about each unit of data (e.g., about each extent block or other unit of data on a physical and/or virtual disk, and the like), is obtained and/or retrieved from master server 165 by accelerator module 150. State file 175 includes information about units of data that are already part of a base backup image (e.g., units of data that been written to an original full backup image stored on target storage device 190(1) as part of a previous full or incremental backup operation).

Based on the information in state file 175, accelerator module 150 consolidates units of changed data with a list of units of data that are part of the base backup image. Accelerator module 150 initially transfers only units of changed data to deduplication module 155. Once units of changed data are deduplicated (e.g., deduplicating multiple units of data that are modified similarly), a consolidated full backup is generated.

State file 175 is then updated by master server 165 and transferred to source server 140 and/or target server 180 after the backup of each physical and/or virtual disk is completed. In some embodiments, node 105 can send the units of changed data and metadata 125 associated with the units of changed data directly to source server 140 and/or target server 180 to create a consolidated full backup. In this example, source proxy 145 and/or target proxy 185 simply retrieves any units of data not sent by node 105 from the base backup image (e.g., based on state file 175), and creates a consolidated full backup.

It should be noted that accelerator module 150 need only generate catalog data for units of changed data. When a synthetic full backup image is generated by source server 140 and/or target server 180, accelerator module 150 transfers catalog information (e.g., information noting the location of storage units in a backup image) for a full backup to master server 165. Therefore, a synthetic full backup operation performed using computing system 100 of FIG. 1 typically consumes as much catalog space as a traditional full backup, although catalog information can be stored incrementally, as well.

However, because accelerator module 150 only requires units of changed data to create a synthetic full backup, accelerator module 150 can create the synthetic full backup in approximately the same time it takes to create an incremental backup. Further, by only sending the data and metadata for a full backup occasionally (and just incremental backups in between), such an approach avoids wasteful and redundant storage operations.

Figure 2:
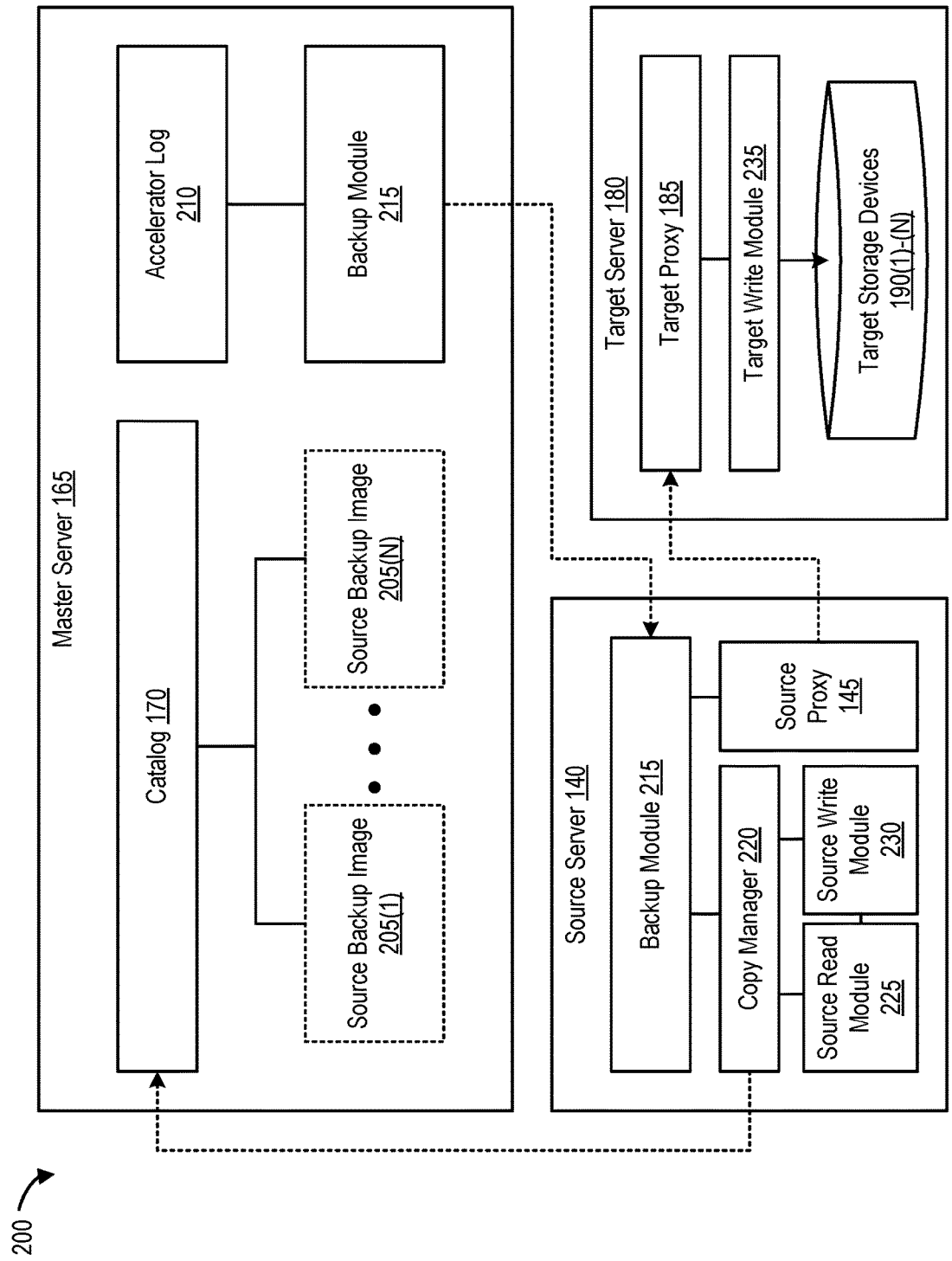
FIG. 2 is a block diagram of a computing system 200 that implements multiple heterogeneous storage servers, according to one embodiment of the present disclosure.

FIG. 2 is a block diagram of computing system 200 that implements multiple heterogeneous storage servers, according to one embodiment. Like computing system 100 of FIG. 1, computing system 200 depicted in FIG. 2 includes master server 165, source server 140, and target server 180.

As shown in FIG. 2, master server 165 includes catalog 170, accelerator log 210, and a backup module 215. Catalog 170 maintains information contained in one or more source backup images (e.g., source backup images 205(1)-(N)). Accelerator log 210 tracks whether storage units have the same value (e.g., the same data), or whether these storage units are frequently accessed from related storage locations in a backup image. Therefore, accelerator log 210 can track whether certain storage units are reused within a relatively small time duration, or whether two or more storage units are in relatively close storage locations.

Backup module 215 (implemented by master server 165 and/or source server 140), determines whether to include one or more storage units in a backup stream, and also determines when and whether to send the backup stream to source server 140. If a storage unit has changed or has been modified in some manner, backup module 215 includes the storage unit in a backup stream and sends the backup stream to source server 140. Source server 140 then stores the storage unit(s) in a backup image.

In addition to the storage unit itself, backup module 215 also includes header information for the storage unit in the backup stream. A header is metadata that includes information indicating whether the storage unit is a new storage unit or an existing storage unit (e.g., whether the storage unit contains data which is new, or has been changed and/or modified in some fashion). Backup module 215 only includes new storage unit(s) in the backup stream and includes headers for existing storage units, respectively.

Source server 140 also includes a copy manager 220, a source read module 225, a source write module 230, and source proxy 145 (e.g., a source backup host). Copy manager 220 can be used to perform data duplication operations based on one or more source backup images (e.g., source backup images 205(1)-(N)). Source read module 225 reads and analyzes the contents of a source backup stream (e.g., to determine whether one or more storage unit(s) in the source backup stream contain new data and/or changed data). Source write module 230 writes the backup stream to a source storage device (e.g., source storage device 160(1) after performing deduplication). Source proxy 145 facilitates communication between source server 140 and target server 180 during the performance of data storage-related operations, described herein.

Similarly, target server 180 includes a target proxy 185, a target write module 235, and target storage devices 190(1)-(N). Target proxy 185 receives a replication stream (and other associated information, metadata, instructions, and the like) from source server 140. Target write module 235 writes the data in this replication stream to a backup image (e.g., a replicated backup image stored on a target storage device (e.g., target storage device 190(1)) or performs one or more instructions received as part of the replication stream.

An Example Computing System to Record Instructions

Figure 3A:
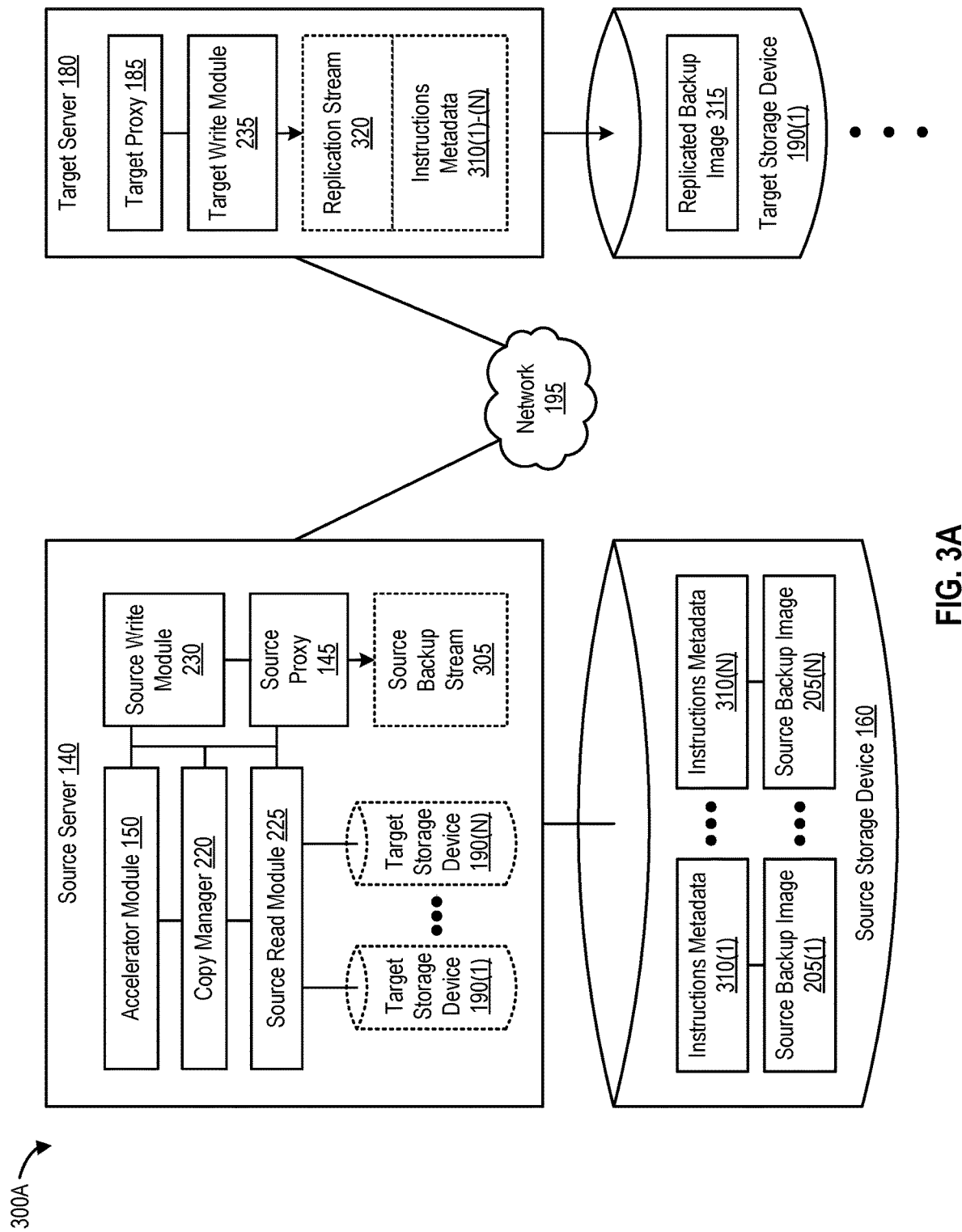
FIG. 3A is a block diagram of a computing system 300A that performs data replication between heterogeneous storage servers, according to one embodiment of the present disclosure.

FIG. 3A is a block diagram of computing system 300A that records instructions as part of and/or in association with a backup operation, according to one embodiment. Computing system 300A includes source server 140, source storage device 160, target server 180, and target storage device 190(1)). As shown in FIG. 3A, source server 140 includes accelerator module 150, copy manager 220, source read module 225, source write module 230, and source proxy 145. Source server is communicatively coupled to source storage device 160 and also receives information (e.g., from master server 165 and/or source server 140) identifying the contents of one or more target storage devices (e.g., the contents of one or more backup images) implemented by target server 180 (e.g., target storage devices 190(1)-(N)).

Source server 140 generates instructions metadata (e.g., instructions metadata 310(1)-(N)) for each source backup image (e.g., source backup images 210(1)-(N)). In this example, source server 140 stores the instructions metadata along with the source backup image in source storage device 160. It should be noted that instructions metadata 310(1)-(N) and source backup images 205(1)-(N) can be stored on a storage device that is different than source storage device 160. For example, instructions metadata 310(1)-(N) and source backup images 205(1)-(N) can be stored on a storage device associated with node 105 and/or master server 165.

In addition to target proxy 185 and target write module 235, target server 180 receives a replication stream 320 and instructions metadata 310(1)-(N), which in this example, is received as part of replication stream 320. It should be noted that replication stream 320 and instructions metadata 310 (1)-(N) can be received by target server 140 separately, and from different computing entities (other than source server 140).

In one embodiment, target server 180 receives replication stream 320 and instructions metadata 310(1) from source server 140 (e.g., via target proxy 185). As noted, instructions metadata 310(1) can be received by target server 180 as part of replication stream 320, or separately (as long as target proxy 185 and/or target write module 235 is able to determine that instructions metadata 305(1) is associated with and/or is related to replication stream 320 in some manner). In this example, target server 180 generates replicated backup image 315 based on the received replication stream 320 and instructions metadata 310(1), and stores the replicated backup image 315 in target storage device 190(1).

Figure 3B:
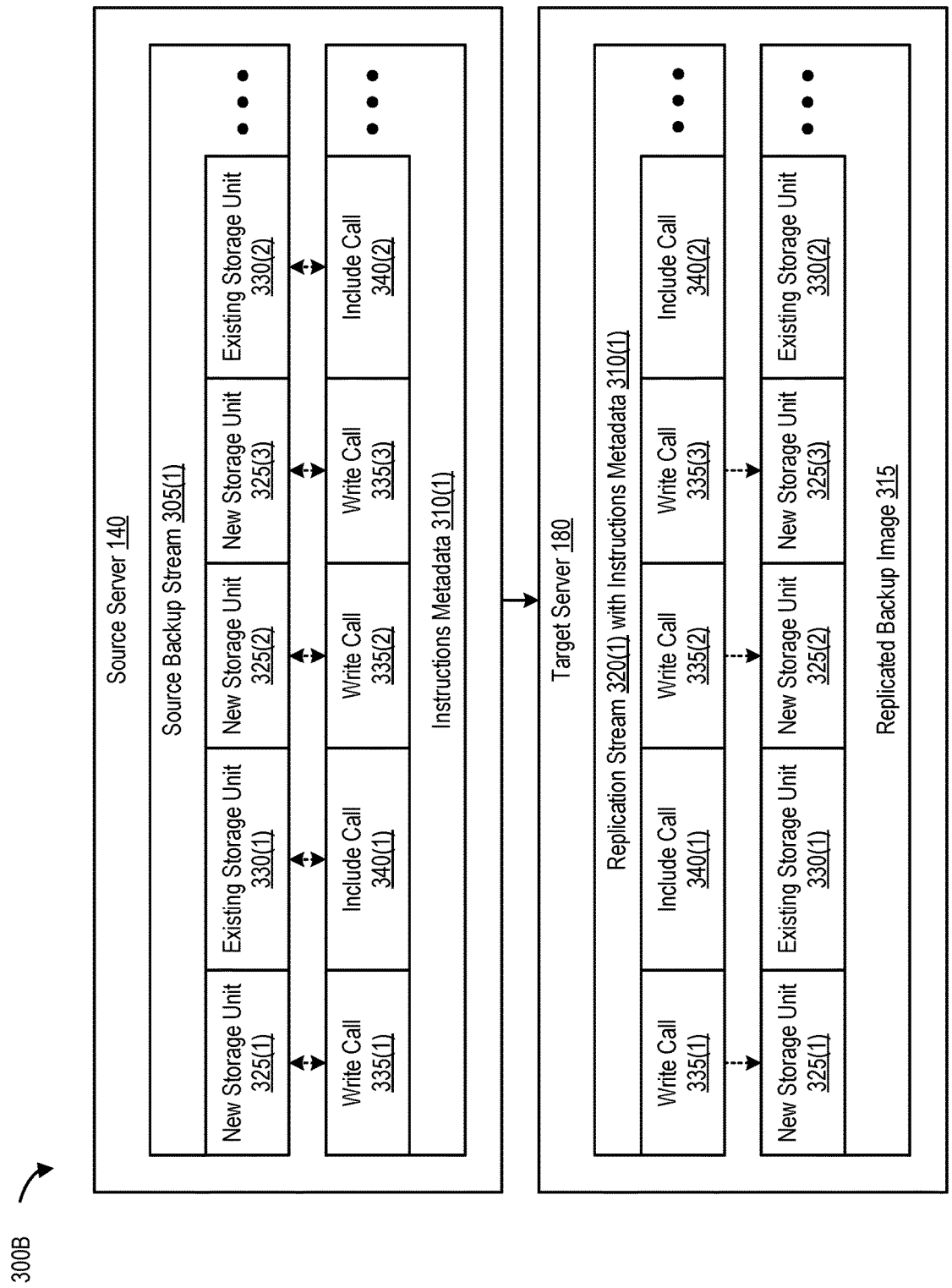
FIG. 3B is a block diagram of recorded instructions, according to one embodiment of the present disclosure.

FIG. 3B is a block diagram of recorded instructions, according to one embodiment. Accelerator module 150, in conjunction with copy manager 220, source read module 225, source write module 230, and source proxy 145, records information associated with a backup stream (e.g., source backup stream 305(1)) during a backup operation. The information includes instructions (e.g., instructions metadata 310(1)). The instructions include an include instruction (e.g., include calls 340(1) and 340(2) to include existing data), as well as a write instruction (e.g., write calls 335(1), 335(2), and 335(3) to write new data) during (the performance of) a replication operation.

In one embodiment, source server 140 receives a request to perform a replication operation (e.g., from target server 180 or master server 165). In response to the request, source server 140 sends instructions metadata to target server 180 as part of performing the replication operation. In this example, the existing data is part of (and included in) replicated backup image 315 stored by target server 180 (e.g., in target storage device 190(1)). The new data and the instructions metadata are included in a source backup image (e.g., source backup image 205(1)), and the source backup image is stored by source server 140 as part of the backup operation.

In some embodiments, upon receiving the request to perform the replication operation, source server 140 accesses replicated backup image 315, compares replicated backup image 315 and the information (e.g., instructions metadata 310(1)), generates replication stream 320(1) that includes the new data, and sends replication stream 320(1) to target server 180. It should be noted that in this example, source storage device 160 (and/or source server 140) and target storage device 190(1) (and/or target server 180) are heterogeneous.

In certain embodiments, instructions metadata 310(1) includes a first offset range associated with the existing data (e.g., existing storage unit 330(1)) to be included from replicated backup image 315, and a second offset range associated with the new data (e.g., new storage unit 325(1)) to be written to replicated backup image 315 from one or more source backup images. In this example, replication stream 320(1) and source backup stream 305(1) share a common format that is facilitated by plug-in that implements a protocol independent API (e.g., Open Storage Technology (OST) API).

Examples of Performing Replication Between Heterogeneous Storage Systems

Figure 4A:
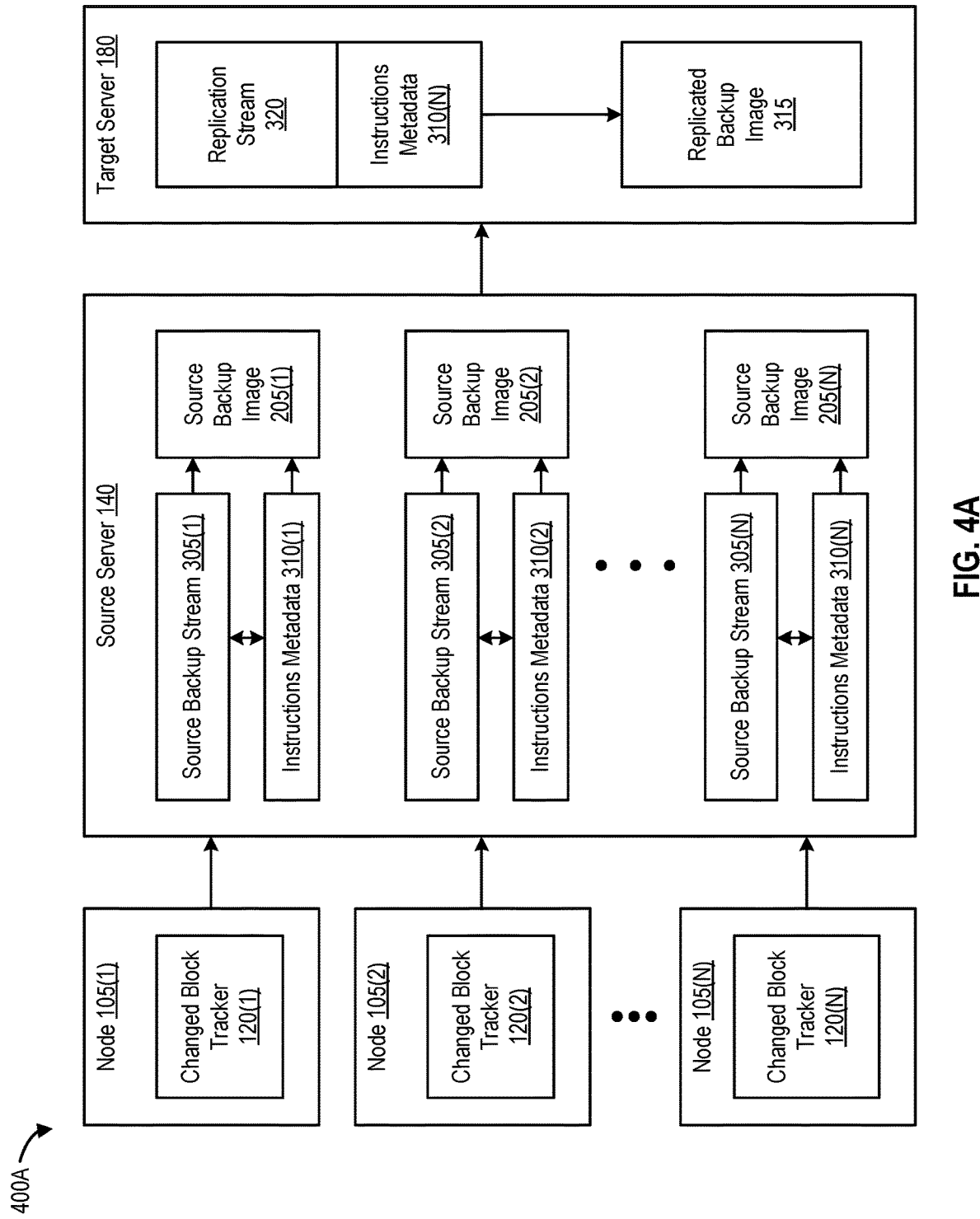
FIG. 4A is a block diagram of a computing system 400A that synthesizes a replicated backup image, according to one embodiment of the present disclosure.

FIG. 4A is a block diagram of computing system 400A that synthesizes a replicated backup image based on received instructions, according to one embodiment. Computing system 400A includes nodes 105(1)-(N), source server 140, and target server 180. Each node includes a changed block tracker (e.g., changed block trackers 120(1)-(N)). Source server 140 includes one or more source backup streams (e.g., source backup streams 301(1)-(N)) and corresponding (or associated and/or related) instructions metadata (e.g., instructions metadata 310(1)-(N)).

Source server 140 generates a corresponding source backup image (e.g., source backup images 205(1)-(N)) for each source backup stream (e.g., source backup streams 305(1)-(N)) using client-side change tracking. As noted, NetBackup Accelerator uses client-side change tracking and deduplication (e.g., by implementing changed block tracker 120(1), accelerator log 210, accelerator module 150, and/or deduplication module 155) to synthesize units of changed data with previous full backup images to generate a new backup image.

A backup stream selected for backup by NetBackup Accelerator is called a Tar stream. The header of the Tar stream can be analyzed (e.g., using a backup stream handler) to determine whether to write new data to an existing backup image or to include existing data from a previous backup image. The header to "include" an existing storage unit (e.g., an include call) can be extracted along with the existing storage unit from a previous backup image (e.g., a base backup image). During a backup operation, source server 140 records information (e.g., instructions metadata 310(1) and 310(2)). These "instructions" (e.g., write calls or include calls) can be performed by target server 180 as part of a replication operation.

Figure 4B:
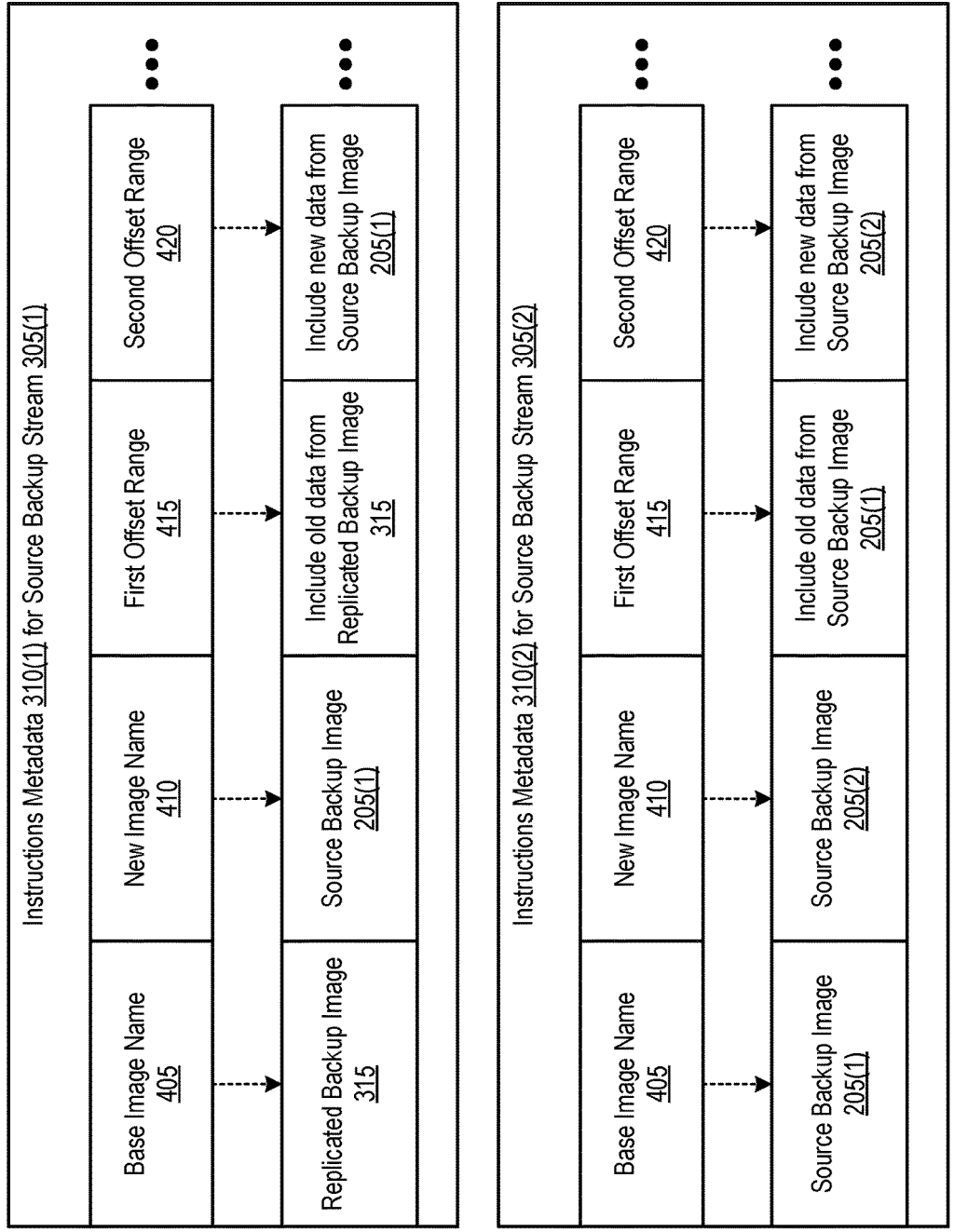
FIG. 4B is a block diagram of instructions metadata for a source backup stream, according to one embodiment of the present disclosure.

FIG. 4B is a block diagram of recording "instructions as part of a backup operation, according to one embodiment. As shown in FIG. 4B, instructions metadata 310(1) for source backup stream 305(1) includes at least a base image name 405, a new image name 410, a first offset range 415, and a second offset range 420. Base image name 405 is recorded as replicated backup image 315 and new image name 410 is recorded as source backup image 205(1). First offset range 415 includes instructions to include old data (e.g., existing storage unit 330(1) and 330(2) as shown in FIG. 3B) from replicated backup image 315, whereas second offset range 420 includes instructions to include new data (e.g., new storage units 325(1), 325(2), and 325(3) as shown in FIG. 3B) from source backup image 205(1).

If and when a new source backup stream is selected or received for backup, storage server 140 records base image name 405 as source backup image 205(1), and new image name 410 as source backup image 205(2). In this example, first offset range 415 includes instructions to include old data from source backup image 205(1), whereas second offset range 420 includes instructions to include new data from source backup image 205(2). In this manner, source server 140 records instructions metadata in an incremental manner. These instructions metadata can later be used by source server 140 and target server 180 during a replication operation.

Example Processes to Perform Replication Between Heterogeneous Storage Systems

Figure 5B:
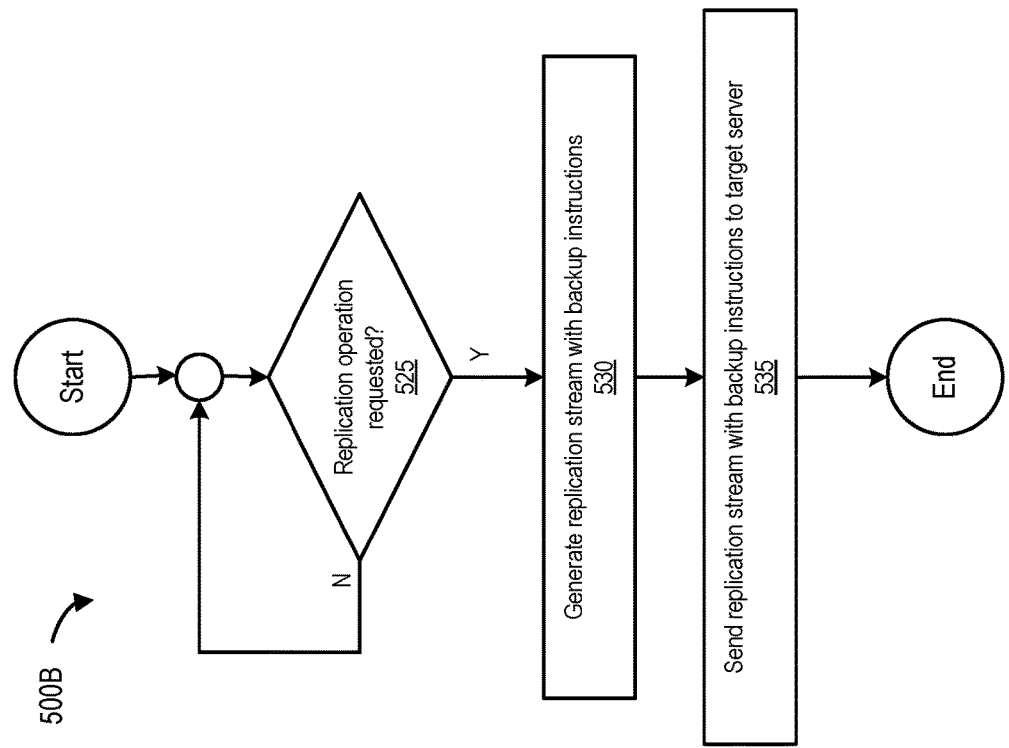
FIG. 5B is a flowchart that illustrates a process for generating a backup stream with instructions, according to one embodiment of the present disclosure.
Figure 5A:
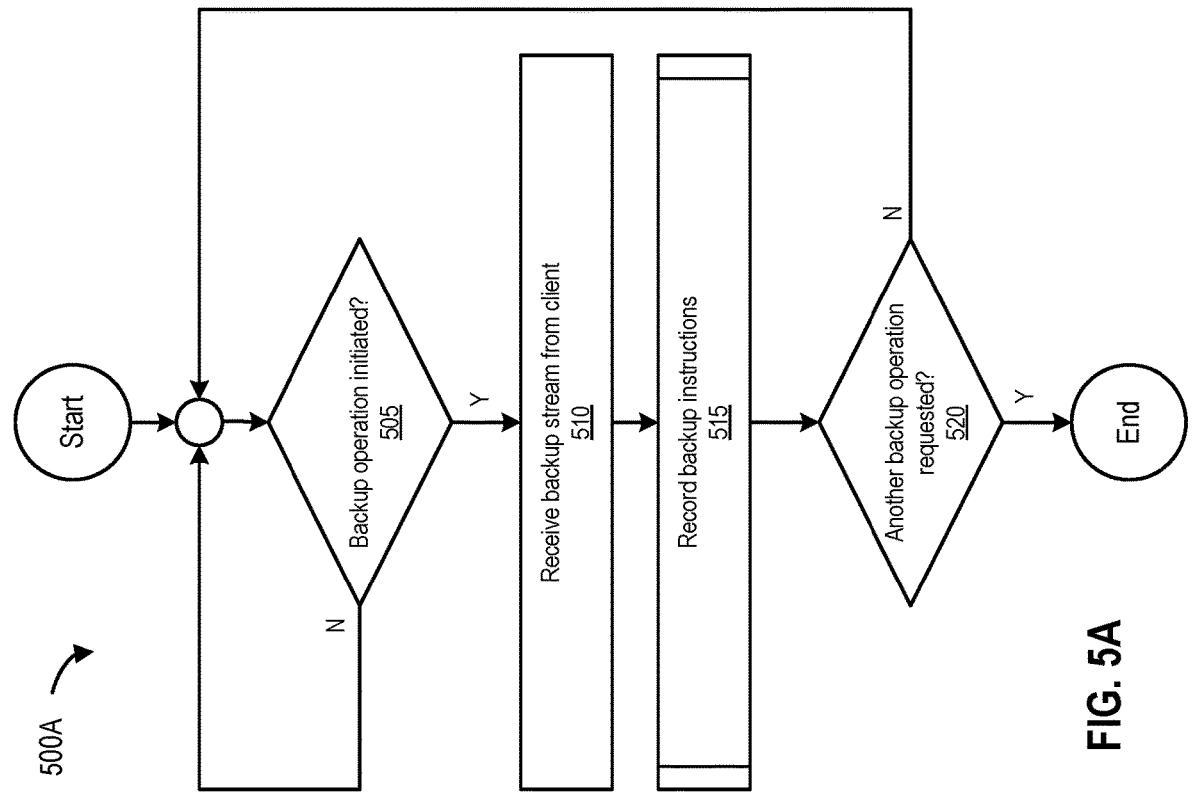
FIG. 5A is a flowchart that illustrates a process for recording backup instructions, according to one embodiment of the present disclosure.

FIG. 5A is a flowchart that illustrates a process for recording backup instructions, according to one embodiment. The process begins at 505 by determining if a backup operation has been initiated (e.g., by backup module 215). If a backup operation has been initiated, the process, at 510, receives a backup stream from a client (e.g., source backup stream 305(1) from node 105(1) as shown in FIG. 4A). At 515, the process records backup instructions (e.g., in the form of instructions metadata 310(1)) by analyzing the source backup stream (e.g., by extracting header information of the Tar stream) and including write calls or include calls (e.g., write calls 335(1), 335(2), and 335(3) or include calls 340(1) and 340(2) as shown in FIG. 3B) as part of the (modified) header information for each unit of data in the source backup stream (e.g., new storage unit(s) and existing storage unit(s) as shown in FIG. 3B). The process ends at 520 by determining if another backup operation has been requested.

FIG. 5B is a flowchart that illustrates a process for generating a backup stream with instructions, according to one embodiment. The process begins at 525 by determining if a replication operation has been requested (e.g., by target server 180). If a replication operation has been requested, the process, at 530, generates a replication stream (e.g., replication stream 320) with backup instructions (e.g., instructions metadata 310(1)-(N)). The process ends at 535 by sending (or transmitting) the replication stream along with the backup instructions (either together or separately, and at the same time, or at different times) to target server 180. The replicated backup image (e.g., replicated backup image 315) can then be updated by target server 180 based on the backup instructions (e.g., using target write module 235).

Figure 5C:
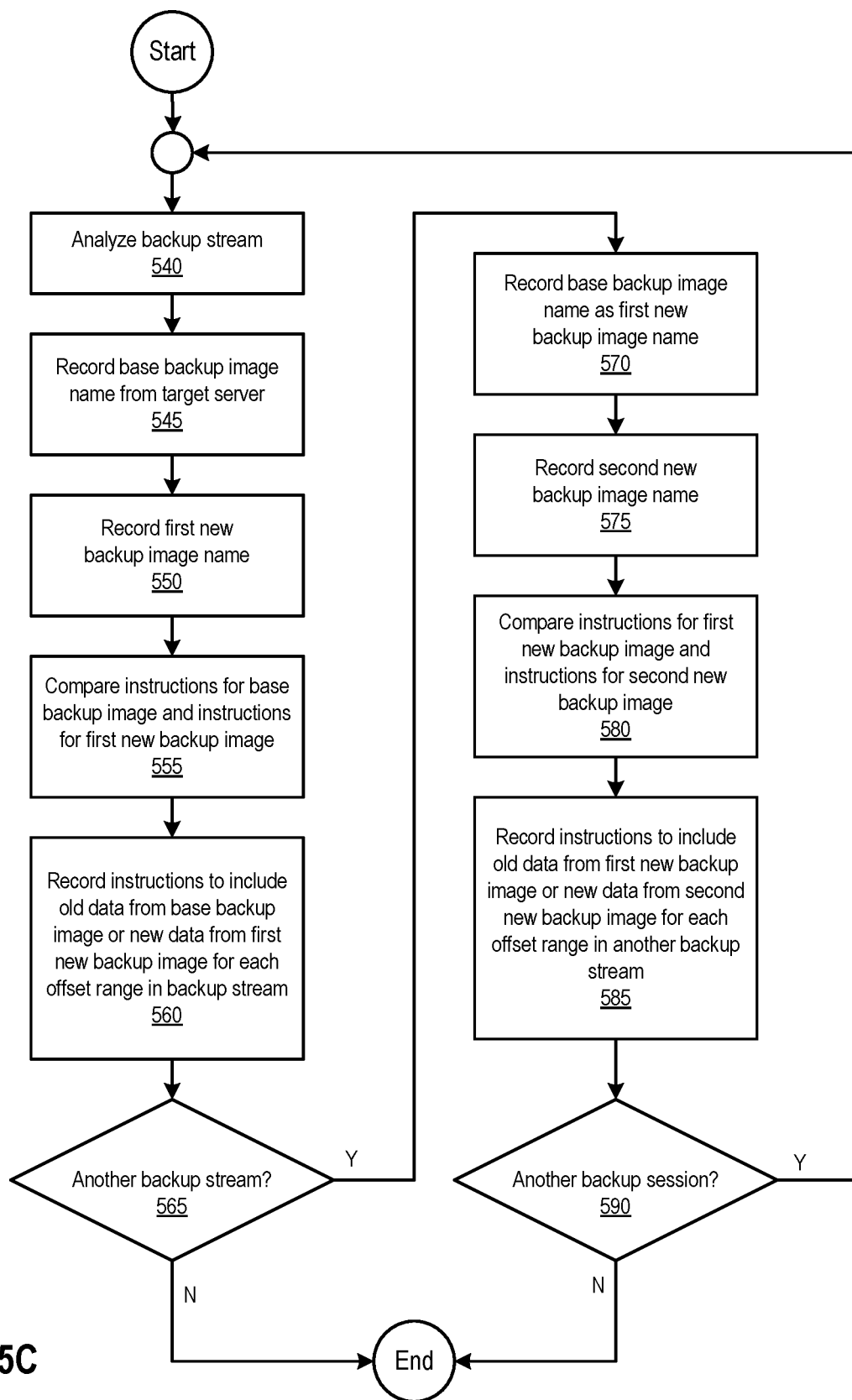
FIG. 5C is a flowchart that illustrates a process for analyzing a backup stream, according to one embodiment of the present disclosure.

FIG. 5C is a flowchart that illustrates a process for analyzing a backup stream, according to one embodiment. The process begins at 540 by analyzing a backup stream (e.g., source backup stream 305(1)). At 545, the process records a base backup image name from target server 180 (e.g., replicated backup image 315). At 550, the process records a first new backup image name (e.g., source backup image 205(1)). At 555, the process compares instructions (e.g., instructions metadata) for the base backup image and the first new backup image. At 560, the process records instructions to include old data from the base backup image or new data from the first new backup image for each offset range in the backup stream.

At 565, the process determines if there is a subsequent (or another) backup stream to analyze. If there is a subsequent (or another) backup stream, the process, at 570, records the base backup image name as the first new backup image name. At 575, the process records a second new backup image name. At 580, the process compares instructions for the first new backup image and instructions for the second new backup image. At 585, the process records instructions to include old data from the first new backup image or new data from the second new backup image for each offset range in the subsequent (or another) backup stream. The process ends at 590 by determining if there is another backup session.

It will be appreciated that cumulatively and incrementally recording instructions in this manner promotes data replication efficiency by lowering source (storage) server I/O, minimizing network transfer of data between heterogeneous source and target servers, and reducing backend storage requirements.

Figure 6B:
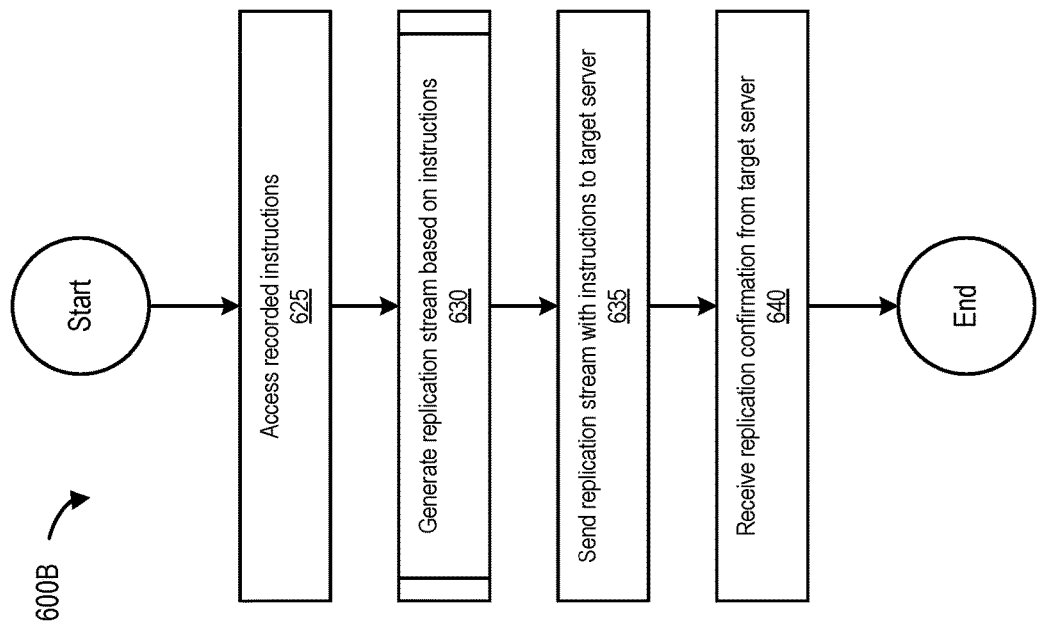
FIG. 6B is a flowchart that illustrates a process for receiving a replication confirmation from a target server, according to one embodiment of the present disclosure.
Figure 6A:
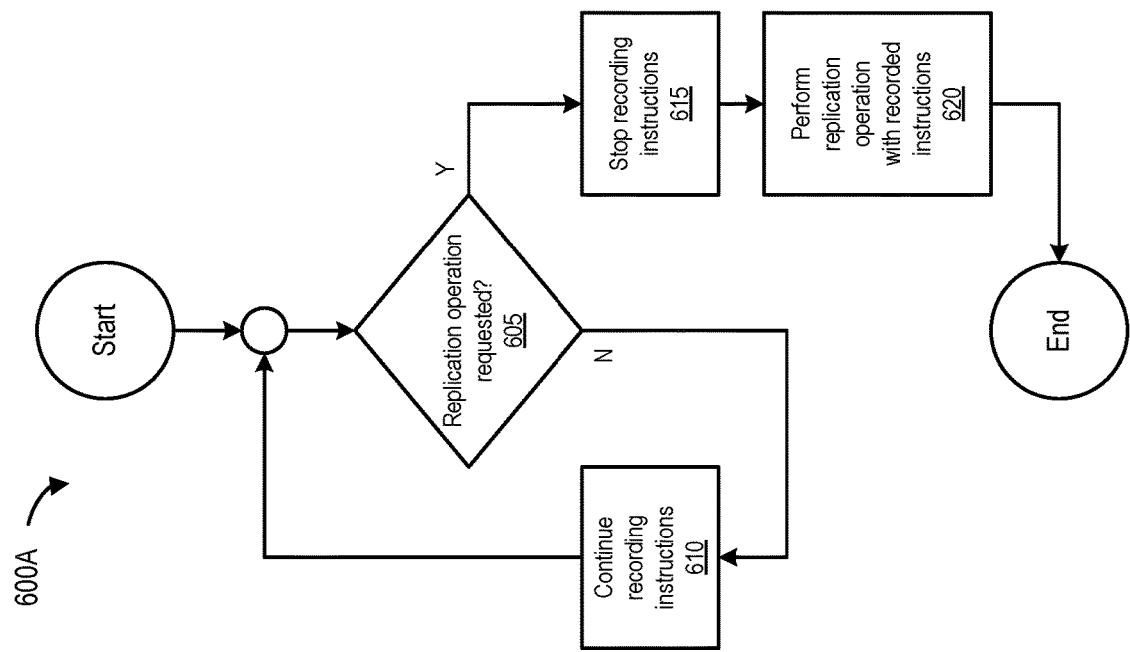
FIG. 6A is a flowchart that illustrates a process for performing a replication operation with recorded instructions, according to one embodiment of the present disclosure.

FIG. 6A is a flowchart that illustrates a process for performing a replication operation with recorded instructions, according to one embodiment. The process begins at 605 by determining if a replication operation has been requested. If a replication operation has not been requested, the process, at 610, continues recording instructions (e.g., instructions metadata 310(1)-(N)). However, if a replication operation has been requested (e.g., by target server 180), the process, at 615, stops recording instructions, and ends at 620 by performing a replication operation with recorded instructions (e.g., generating replication stream 320 with instructions metadata 310(1)-(N) and sending replication stream 320 and instructions metadata 310(1)-(N) to target server 180).

FIG. 6B is a flowchart that illustrates a process for receiving a replication confirmation from a target server, according to one embodiment. The process begins at 625 by accessing recorded instructions. At 630, the process generates a replication stream (e.g., replication stream 320) based on the recorded instructions. At 635, the process sends the replication stream and the recorded instructions (together or separately) to target server 180. The process ends at 640 by receiving a confirmation from target server 180 (that the replication stream and the recorded instructions have been received).

Figures 6C, 6D:
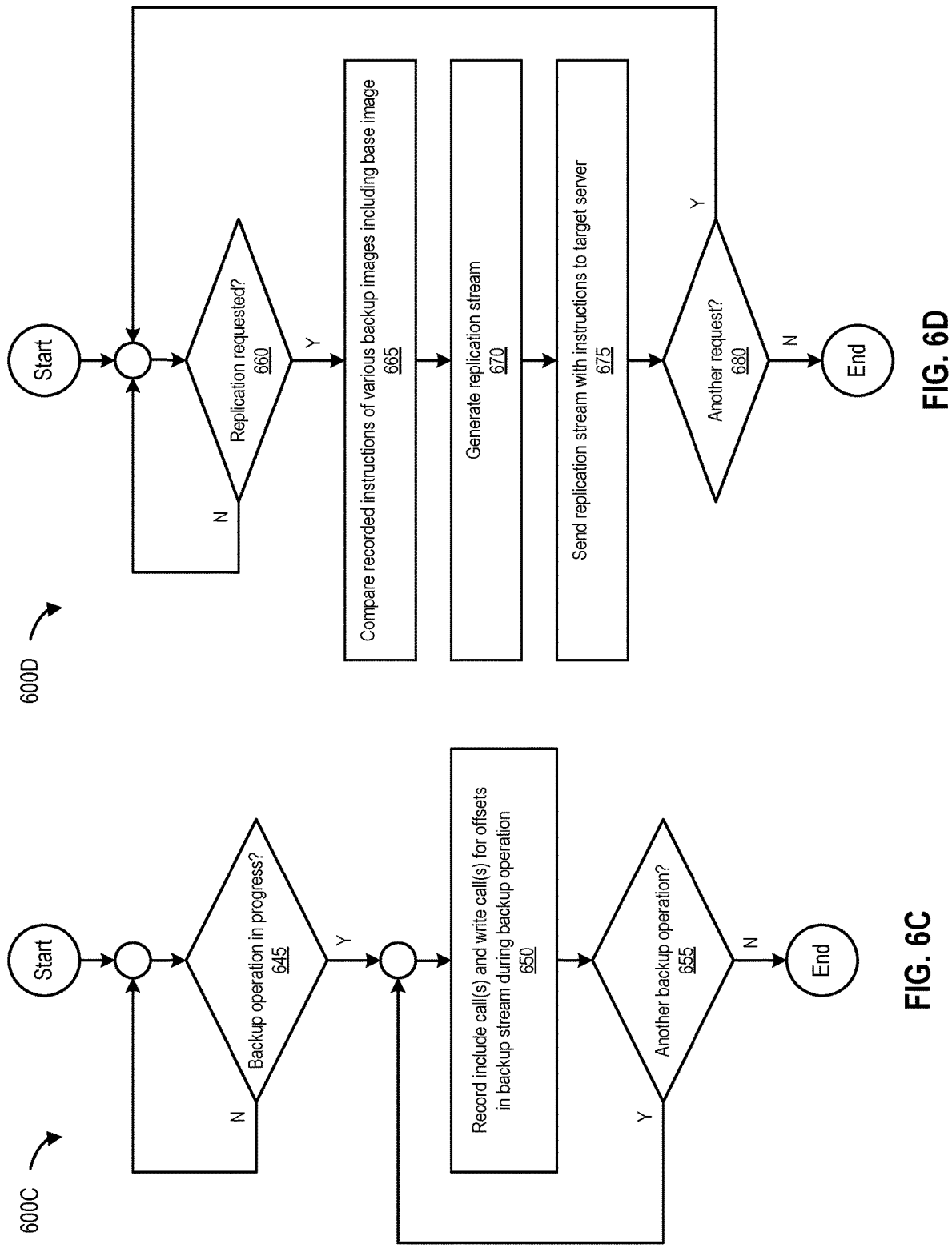
FIG. 6C is a flowchart that illustrates a process for recording include call(s) and write call(s), according to one embodiment of the present disclosure.
FIG. 6D is a flowchart that illustrates a process for comparing recorded instructions of backup images, according to one embodiment of the present disclosure.

FIG. 6C is a flowchart that illustrates a process for recording include call(s) and write call(s), according to one embodiment. The process begins at 645 by determining if a backup operation is in progress. If a backup operation is in progress, the process, at 650, records include call(s) and/or write call(s) for offsets in the backup stream (e.g., source backup stream 305(1)). The process ends at 655 by determining if there is another backup operation.

FIG. 6D is a flowchart that illustrates a process for comparing recorded instructions of backup images, according to one embodiment. The process begins at 660 by determining if a replication (operation) has been requested. If a replication operation has been requested, the process, at 665, compares recorded instructions of various backup images (e.g., source backup images 205(1) and 205(2)) including a base backup image (e.g., replicated backup image 315). At 670, the process generates a replication stream (e.g., replication stream 320) and at 675, sends the replication stream with instructions (e.g., instructions metadata 310(1)-(N)) to target server 180 as part of the replication operation.

Figure 7:
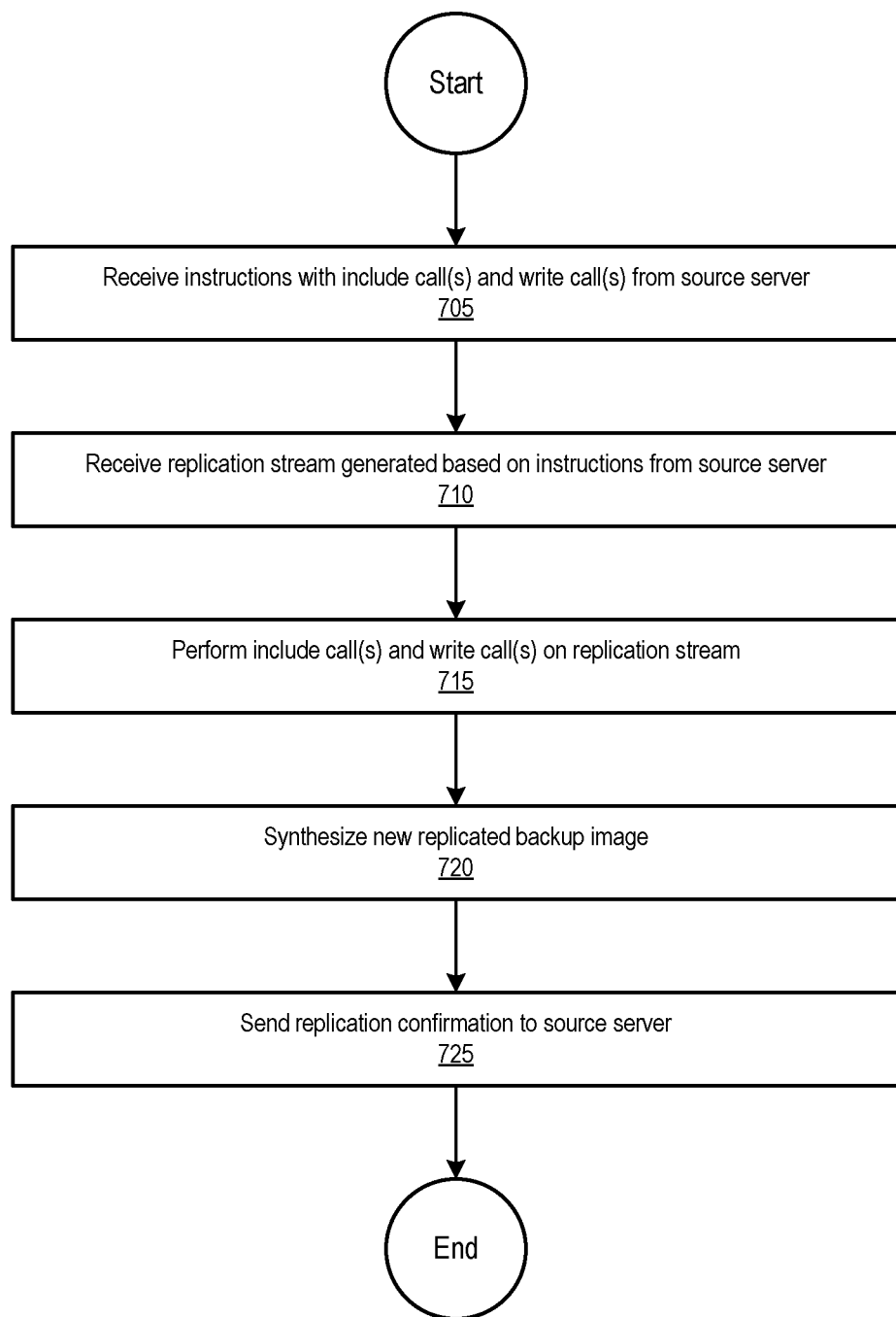
FIG. 7 is a flowchart that illustrates a process for synthesizing a replicated backup image, according to one embodiment of the present disclosure.

FIG. 7 is a flowchart that illustrates a process for synthesizing a replicated backup image, according to one embodiment. The process begins at 705 by receiving instructions with include call(s) and/or write call(s) from source server 140. At 710, the process receives a replication stream generated based on instructions from source server 140. At 715, the process performs the include call(s) and/or the write call(s) on the (received) replication stream. At 720, the process synthesizes (or generates) a new replicated backup image. The process ends at 725 by sending a replication confirmation to source server 140.

It will be appreciated that the systems, methods, and processes described herein promote data replication efficiency by lowering source (storage) server I/O, minimizing network transfer of data between heterogeneous source and target servers, and reducing backend storage requirements because only new and/or modified data as well as instructions (in the form of instructions metadata) is transmitted from the source server to the target server.

An Example Computing System

Figure 8:
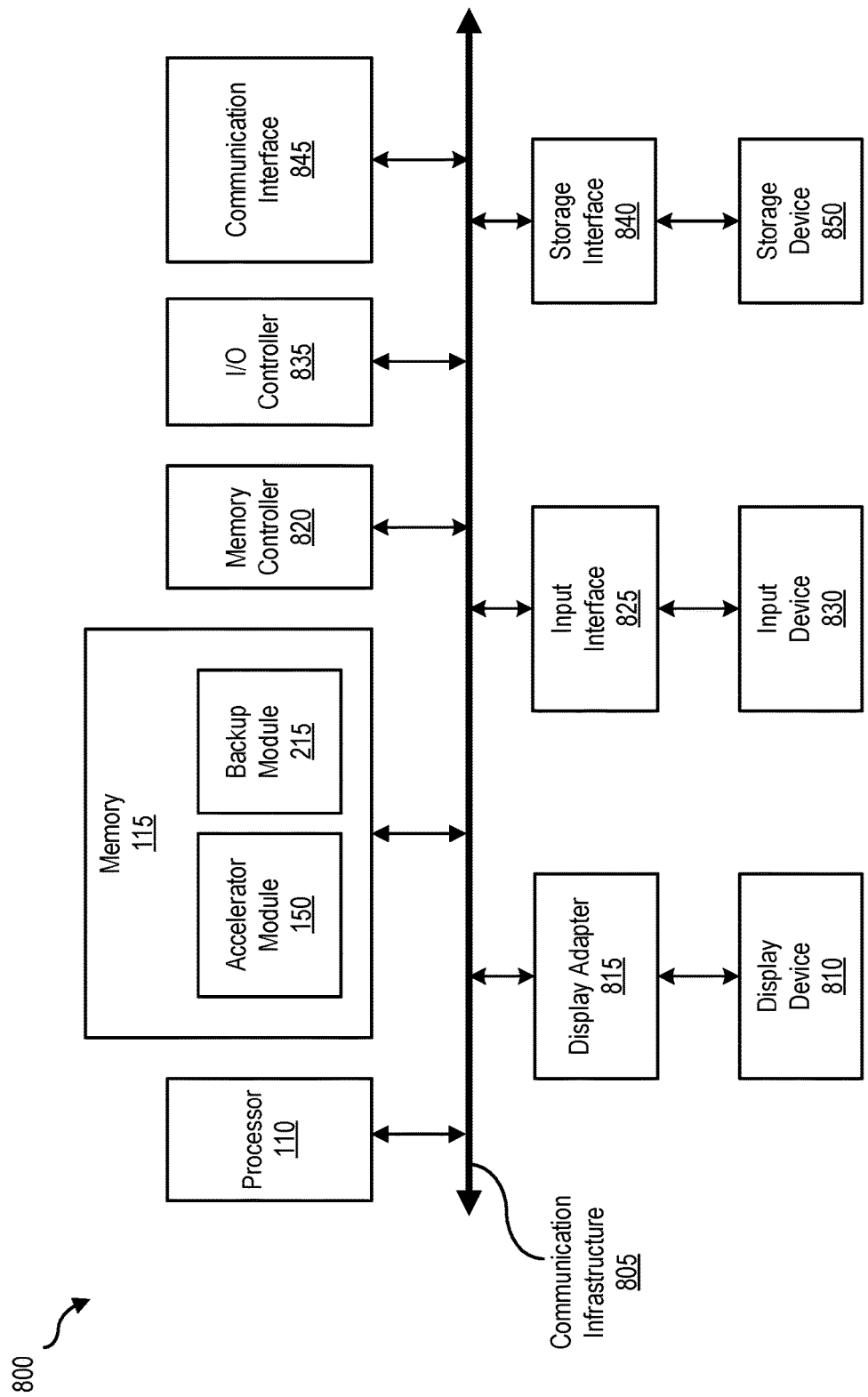
FIG. 8 is a block diagram of a computing system 800 that performs data replication between heterogeneous storage servers, according to one embodiment of the present invention.

FIG. 8 is a block diagram of a computing system 800 that performs data replication between heterogeneous storage servers, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 110 and a memory 115. By executing the software that implements accelerator module 150 and/or backup module 215, computing system 800 becomes a special purpose computing device that is configured to perform replication between heterogeneous storage systems.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Memory 115 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing accelerator module 150 and/or backup module 215 may be loaded into memory 115.

In certain embodiments, computing system 800 may also include one or more components or elements in addition to processor 110 and memory 115. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 110, memory 115, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of nodes 105(1)-(N), source server 140, and/or target server 180. For example, in certain embodiments I/O controller 835 may control or facilitate transfer of data between one or more elements of computing system 800, such as processor 110, memory 115, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 115 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
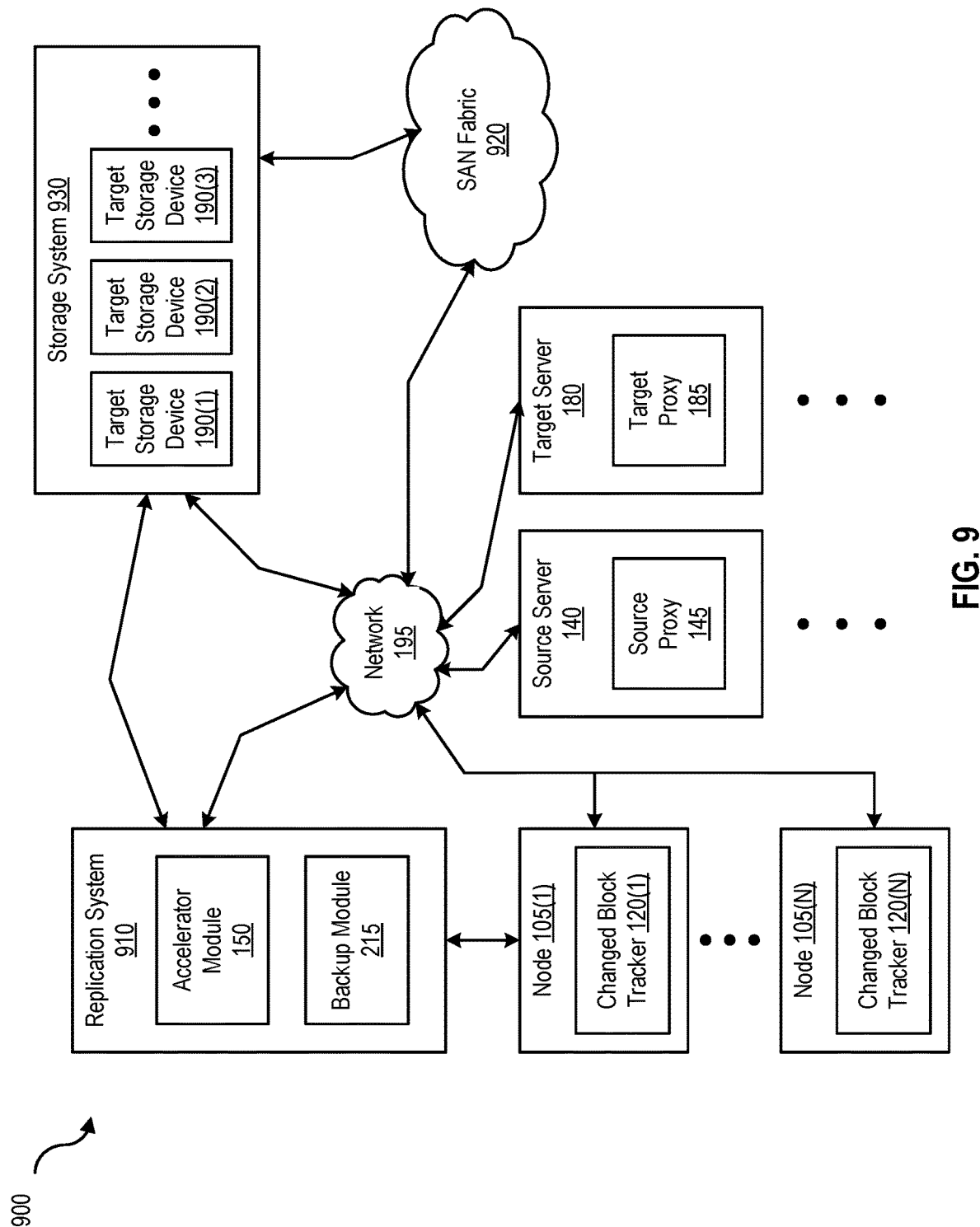
FIG. 9 is a block diagram of a network system, according to one embodiment of the present invention.

FIG. 9 is a block diagram of a networked system, illustrating how various devices can communicate via a network, according to one embodiment. In certain embodiments, network-attached storage (NAS) devices may be configured to communicate with replication system 910 using various protocols, such as Network File System (NFS), Server Message Block (SMB), or Common Internet File System (CIFS). Network 195 generally represents any type or form of computer network or architecture capable of facilitating communication between multiple computing devices. Network 195 may facilitate communication between replication system 910, nodes 105(1)-(N), source server 140, and/or target server 180. In certain embodiments, a communication interface, such as communication interface 845 in FIG. 8, may be used to provide connectivity between nodes 105(1)-(N), source server 140, and/or target server 180, and network 195. It should be noted that the embodiments described and/or illustrated herein are not limited to the Internet or any particular network-based environment. For example, network 195 can be a Storage Area Network (SAN).

In one embodiment, all or a portion of one or more of the disclosed embodiments may be encoded as a computer program and loaded onto and executed by nodes 105(1)-(N), source server 140, and/or target server 180, or any combination thereof. All or a portion of one or more of the embodiments disclosed herein may also be encoded as a computer program, stored on nodes 105(1)-(N), source server 140, and/or target server 180, and distributed over network 195. In some examples, all or a portion of nodes 105(1)-(N), source server 140, and/or target server 180 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, nodes 105(1)-(N), source server 140, and/or target server 180 may transform the behavior of replication system 910 in order to cause replication system 910 to perform replication between heterogeneous storage systems.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   prior to receiving a request to perform a replication operation, recording information during performance of a backup operation, wherein
      the information is associated with a backup stream,
      the information is recorded by a source server,
      the information comprises a plurality of instructions, and
      the plurality of instructions comprise an include instruction to include existing data and a write instruction to write new data, during performance of a replication operation;
   subsequent to recording the information, receiving the request to perform the replication operation;
   upon receiving the request to perform the replication operation, generating a replication stream comprising the new data, wherein
      the replication stream and the backup stream share a common format, and
      the common format is facilitated by a plug-in implementing a protocol-independent Application Programming Interface (API); and
   subsequent to generating the replication stream, sending the information to a target server as part of performing the replication operation, wherein
      the source server uses a first protocol to store data,
      the target server uses a second protocol to store data,
      the first protocol is different from the second protocol, and
      the information further comprises
         first instructions to include, at a first offset range in the replication stream, the existing data from a replicated backup image, and second instructions to include, at a second offset range in the replication stream, the new data to be written to the replicated backup image from a source backup image.

2. The method of claim 1, wherein
the existing data is comprised in the replicated backup image,
the replicated backup image is stored by the target server,
the new data and the information are comprised in the source backup image, and
the source backup image is stored by the source server as part of the backup operation.

3. The method of claim 2, further comprising:
further upon receiving the request to perform the replication operation,
accessing the replicated backup image,
comparing the replicated backup image and the information, and
sending the replication stream to the target server.

4. The method of claim 2, wherein
the source server implements a source storage device,
the source storage device stores the backup stream and the information,
the target server implements a target storage device,
the target storage device stores the replicated backup image, and
the source storage device and the target storage device are heterogeneous.

5. The method of claim 1, further comprising:
updating the information during performance of one or more subsequent backup operations.

6. A non-transitory computer readable storage medium comprising program instructions executable to perform a method comprising:
prior to receiving a request to perform a replication operation, recording information during performance of a backup operation, wherein
the information is associated with a backup stream,
the information is recorded by a source server,
the information comprises a plurality of instructions, and
the plurality of instructions comprise an include instruction to include existing data and a write instruction to write new data, during performance of a replication operation;
subsequent to recording the information, receiving the request to perform the replication operation;
upon receiving the request to perform the replication operation, generating a replication stream comprising the new data, wherein
the replication stream and the backup stream share a common format, and
the common format is facilitated by a plug-in implementing a protocol-independent Application Programming Interface (API); and
subsequent to generating the replication stream, sending the information to a target server as part of performing the replication operation, wherein
the source server uses a first protocol to store data,
the target server uses a second protocol to store data,
the first protocol is different from the second protocol, and
the information further comprises
first instructions to include, at a first offset range in the replication stream, the existing data from a replicated backup image, and
second instructions to include, at a second offset range in the replication stream, the new data to be written to the replicated backup image from a source backup image.

7. The non-transitory computer readable storage medium of claim 6, wherein
the existing data is comprised in the replicated backup image,
the replicated backup image is stored by the target server,
the new data and the information are comprised in the source backup image, and
the source backup image is stored by the source server as part of the backup operation.

8. The non-transitory computer readable storage medium of claim 7, wherein the method further comprises:
further upon receiving the request to perform the replication operation,
accessing the replicated backup image,
comparing the replicated backup image and the information,
and
sending the replication stream to the target server.

9. The non-transitory computer readable storage medium of claim 7, wherein
the source server implements a source storage device,
the source storage device stores the backup stream and the information,
the target server implements a target storage device,
the target storage device stores the replicated backup image,
the source storage device and the target storage device are heterogeneous.

10. A system comprising:
one or more processors; and
a memory coupled to the one or more processors, wherein the memory stores program instructions executable by the one or more processors to perform a method comprising:
prior to receiving a request to perform a replication operation, recording information during performance of a backup operation, wherein
the information is associated with a backup stream,
the information is recorded by a source server,
the information comprises a plurality of instructions, and
the plurality of instructions comprise an include instruction to include existing data and a write instruction to write new data, during performance of a replication operation;
subsequent to recording the information, receiving the request to perform the replication operation;
upon receiving the request to perform the replication operation, generating a replication stream comprising the new data, wherein
the replication stream and the backup stream share a common format, and
the common format is facilitated by a plug-in implementing a protocol-independent Application Programming Interface (API); and
subsequent to generating the replication stream, sending the information to a target server as part of performing the replication operation, wherein
the source server uses a first protocol to store data,
the target server uses a second protocol to store data,
the first protocol is different from the second protocol, and the information further comprises
- first instructions to include, at a first offset range in the replication stream, the existing data from a replicated backup image, and
- second instructions to include, at a second offset range in the replication stream, the new data to be written to the replicated backup image from a source backup image.

11. The system of claim 10, wherein
the existing data is comprised in the replicated backup image,
the replicated backup image is stored by the target server,
the new data and the information are comprised in the source backup image, and
the source backup image is stored by the source server as part of the backup operation.

12. The system of claim 11, wherein the method further comprises:
further upon receiving the request to perform the replication operation,
- accessing the replicated backup image,
- comparing the replicated backup image and the information,
- and
- sending the replication stream to the target server.

13. The system of claim 11, wherein
the source server implements a source storage device,
the source storage device stores the backup stream and the information,
the target server implements a target storage device,
the target storage device stores the replicated backup image,
the source storage device and the target storage device are heterogeneous.

* * * * *